US012684336B2

(12) United States Patent　　(10) Patent No.:　US 12,684,336 B2
　Hong　　(45) Date of Patent:　　Jul. 14, 2026

(54) TERMINAL CAPABILITY REPORTING METHOD AND APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice:　Subject to any disclaimer, the term of this patent is extended or adjusted under 35 U.S.C. 154(b) by 307 days.

(21) Appl. No.:　18/681,329

(22) PCT Filed:　Aug. 5, 2021

(86) PCT No.:　PCT/CN2021/110998
　§ 371 (c)(1),
　(2) Date:　Feb. 5, 2024

(87) PCT Pub. No.: WO2023/010445
　PCT Pub. Date: Feb. 9, 2023

(65)　　　Prior Publication Data
　US 2024/0340635 A1　　Oct. 10, 2024

(51) Int. Cl.
　*H04W 8/22*　　　(2009.01)
(52) U.S. Cl.
　CPC ..................................... *H04W 8/22* (2013.01)
(58) Field of Classification Search
　CPC ......... H04W 8/22; H04W 8/183; H04W 8/24;
　　　　　　　　　　　　　　　　　H04W 8/00
　See application file for complete search history.

(56)　　　　　References Cited

U.S. PATENT DOCUMENTS

| | | | |
|---|---|---|---|
| 2015/0018040 A1* | 1/2015 | He | G06F 21/34 |
| | | | 455/558 |
| 2018/0146365 A1* | 5/2018 | Dhanapal | H04W 8/183 |
| 2019/0215130 A1* | 7/2019 | Aiba | H04L 5/0057 |
| 2022/0141699 A1* | 5/2022 | Yue | H04W 72/51 |
| | | | 370/329 |
| 2023/0055487 A1* | 2/2023 | Jin | H04W 76/16 |
| 2024/0155332 A1* | 5/2024 | Yuan | H04W 8/24 |

FOREIGN PATENT DOCUMENTS

| | | |
|---|---|---|
| CN | 110463238 A | 11/2019 |
| CN | 110495195 A | 11/2019 |
| CN | 110495208 A | 11/2019 |
| CN | 110622612 A | 12/2019 |
| CN | 111817832 A | 10/2020 |
| CN | 112469032 A | 3/2021 |
| CN | 112770316 A | 5/2021 |

(Continued)

OTHER PUBLICATIONS

State Intellectual Property Office of the People's Republic of China, Office Action and Search Report Issued in Application No. 2021800023798, Sep. 19, 2025, 19 pages. (Submitted with English Translation).

(Continued)

*Primary Examiner* — Farid Seyedvosoghi
(74) *Attorney, Agent, or Firm* — Volpe Koenig

(57)　　　　　ABSTRACT

A terminal capability reporting method includes: reporting a terminal capability of the multi-card terminal to a base station.

10 Claims, 8 Drawing Sheets

(56)     References Cited

FOREIGN PATENT DOCUMENTS

EP          4192082  A1  *   6/2023   ............ H04W 72/51

OTHER PUBLICATIONS

ISA State Intellectual Property Office of the People's Republic of China, Written Opinion of the International Searching Authority Issued in Application No. PCT/CN2021/110998, Mar. 23, 2022, WIPO, 7 pages.
ISA State Intellectual Property Office of the People's Republic of China, International Search Report Issued in Application No. PCT/CN2021/110998, Mar. 23, 2022, WIPO, 5 pages.

\* cited by examiner

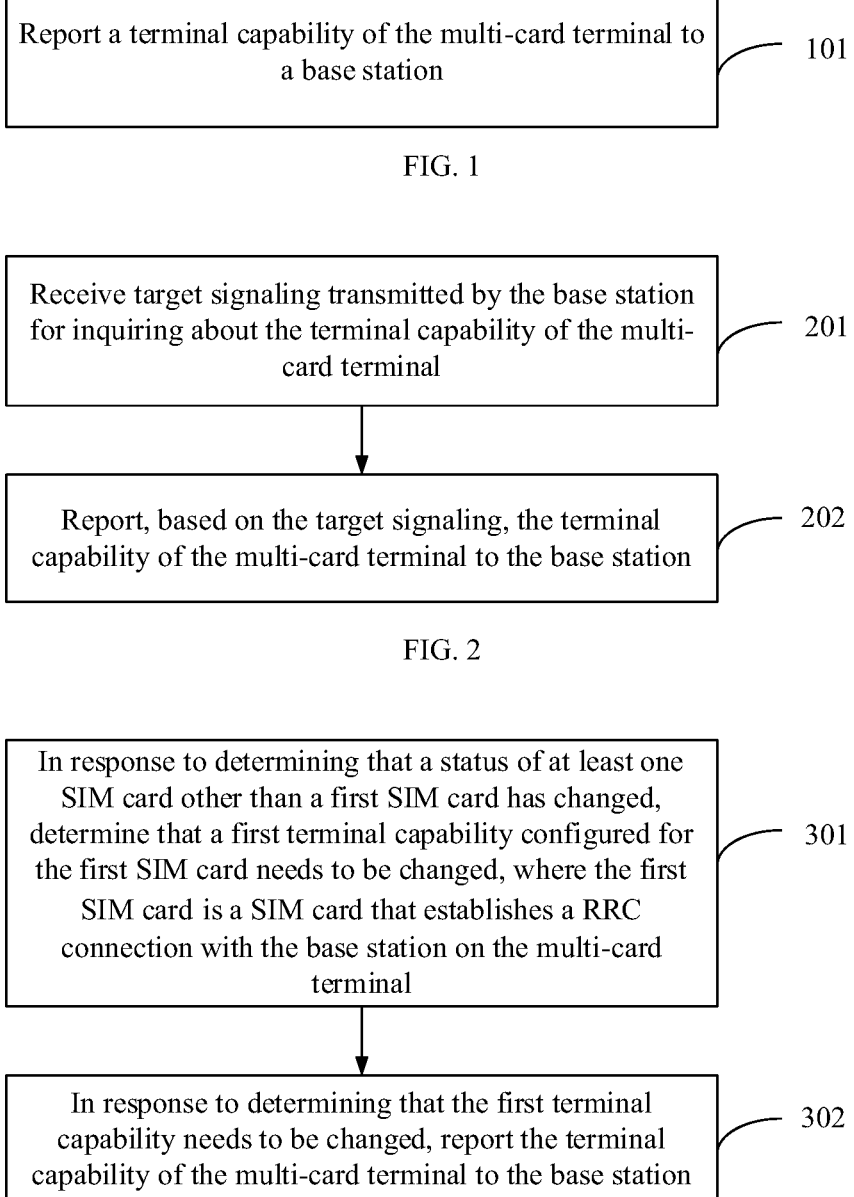

Report a terminal capability of the multi-card terminal to a base station — 101

FIG. 1

Receive target signaling transmitted by the base station for inquiring about the terminal capability of the multi-card terminal — 201

Report, based on the target signaling, the terminal capability of the multi-card terminal to the base station — 202

FIG. 2

In response to determining that a status of at least one SIM card other than a first SIM card has changed, determine that a first terminal capability configured for the first SIM card needs to be changed, where the first SIM card is a SIM card that establishes a RRC connection with the base station on the multi-card terminal — 301

In response to determining that the first terminal capability needs to be changed, report the terminal capability of the multi-card terminal to the base station — 302

FIG. 3

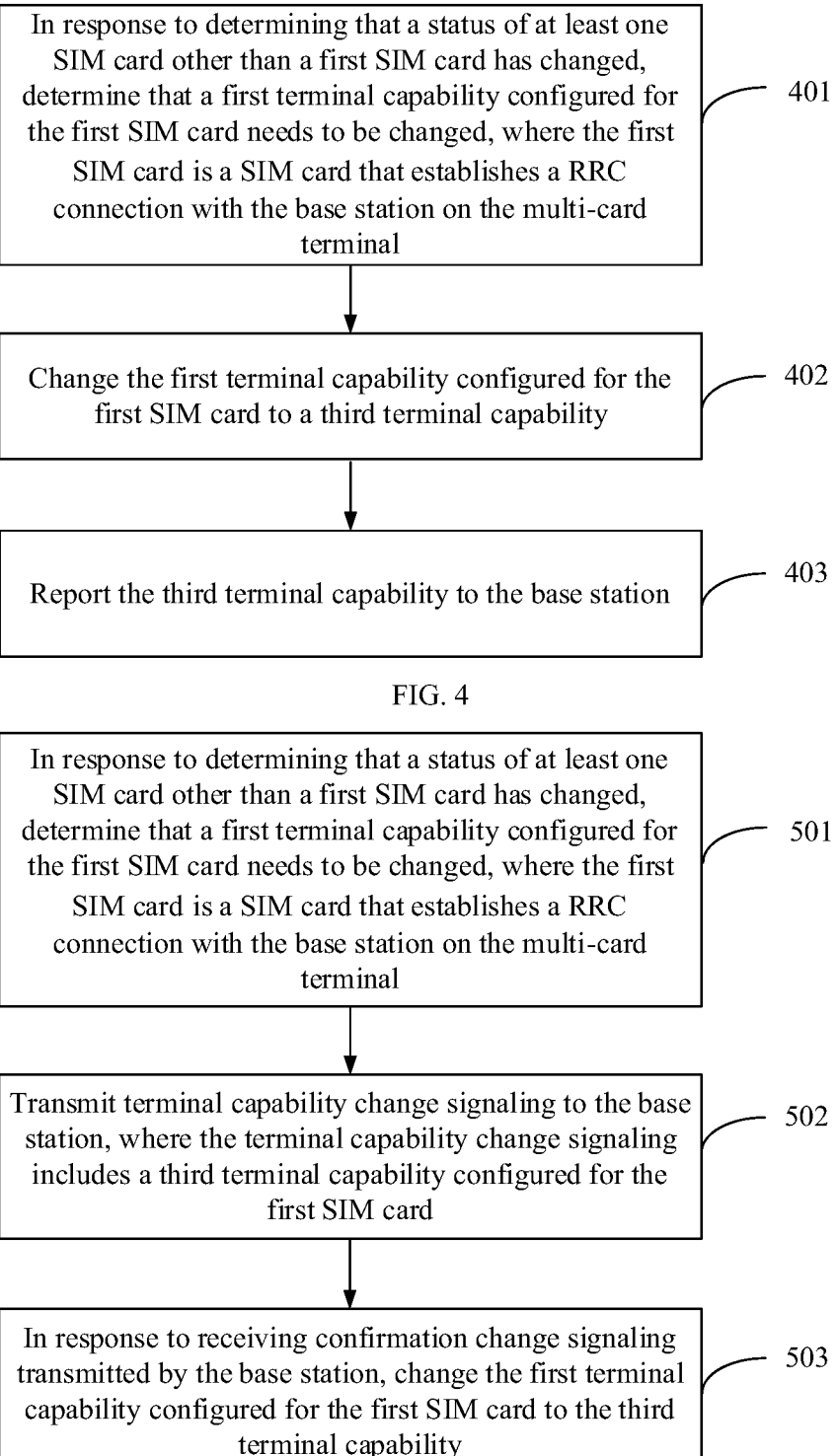

In response to determining that a status of at least one SIM card other than a first SIM card has changed, determine that a first terminal capability configured for the first SIM card needs to be changed, where the first SIM card is a SIM card that establishes a RRC connection with the base station on the multi-card terminal                                    401

Change the first terminal capability configured for the first SIM card to a third terminal capability                                    402

Report the third terminal capability to the base station                                    403

FIG. 4

In response to determining that a status of at least one SIM card other than a first SIM card has changed, determine that a first terminal capability configured for the first SIM card needs to be changed, where the first SIM card is a SIM card that establishes a RRC connection with the base station on the multi-card terminal                                    501

Transmit terminal capability change signaling to the base station, where the terminal capability change signaling includes a third terminal capability configured for the first SIM card                                    502

In response to receiving confirmation change signaling transmitted by the base station, change the first terminal capability configured for the first SIM card to the third terminal capability                                    503

FIG. 5A

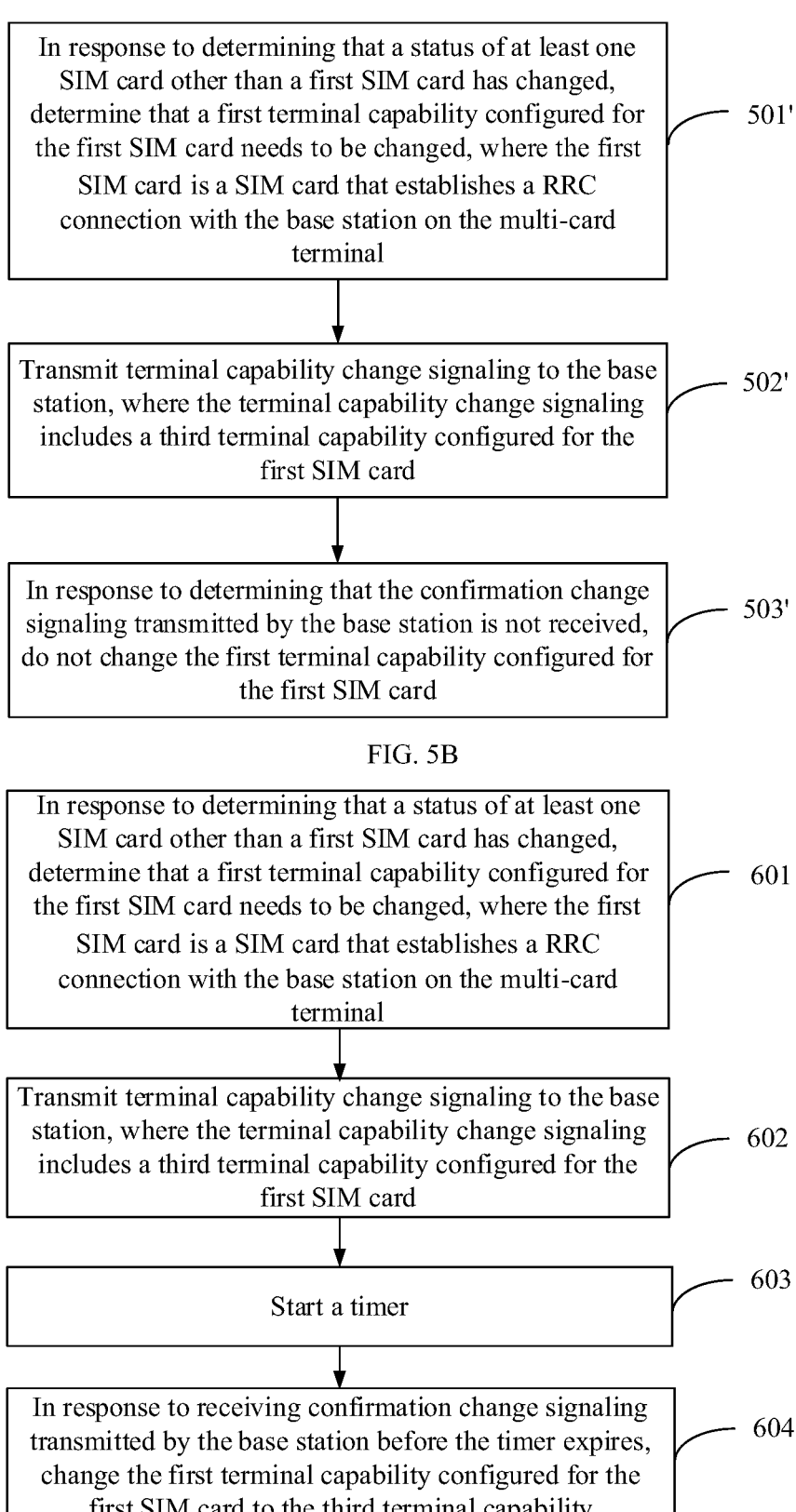

In response to determining that a status of at least one SIM card other than a first SIM card has changed, determine that a first terminal capability configured for the first SIM card needs to be changed, where the first SIM card is a SIM card that establishes a RRC connection with the base station on the multi-card terminal — 501'

Transmit terminal capability change signaling to the base station, where the terminal capability change signaling includes a third terminal capability configured for the first SIM card — 502'

In response to determining that the confirmation change signaling transmitted by the base station is not received, do not change the first terminal capability configured for the first SIM card — 503'

FIG. 5B

In response to determining that a status of at least one SIM card other than a first SIM card has changed, determine that a first terminal capability configured for the first SIM card needs to be changed, where the first SIM card is a SIM card that establishes a RRC connection with the base station on the multi-card terminal — 601

Transmit terminal capability change signaling to the base station, where the terminal capability change signaling includes a third terminal capability configured for the first SIM card — 602

Start a timer — 603

In response to receiving confirmation change signaling transmitted by the base station before the timer expires, change the first terminal capability configured for the first SIM card to the third terminal capability — 604

FIG. 6A

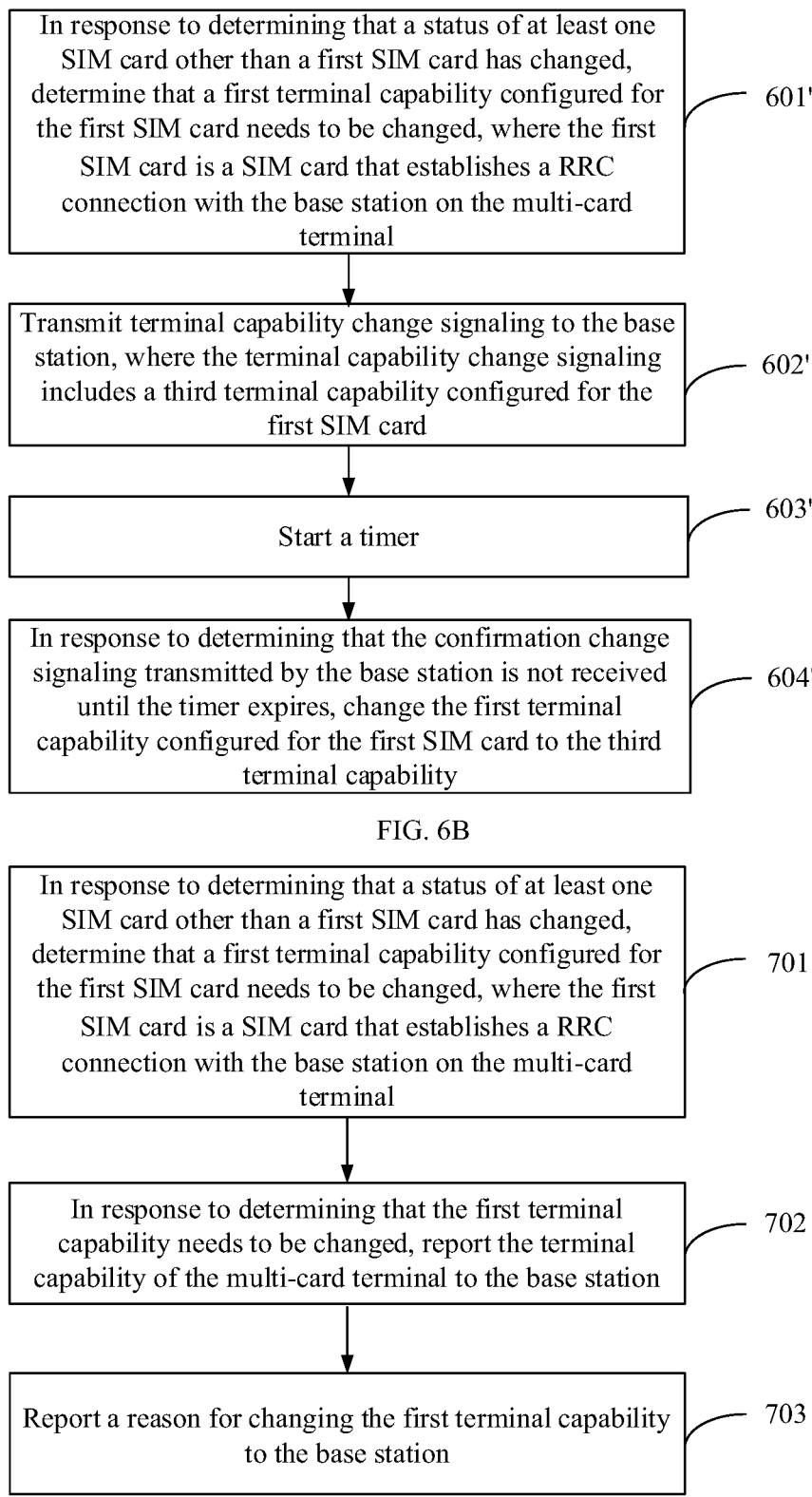

In response to determining that a status of at least one SIM card other than a first SIM card has changed, determine that a first terminal capability configured for the first SIM card needs to be changed, where the first SIM card is a SIM card that establishes a RRC connection with the base station on the multi-card terminal — 601'

Transmit terminal capability change signaling to the base station, where the terminal capability change signaling includes a third terminal capability configured for the first SIM card — 602'

Start a timer — 603'

In response to determining that the confirmation change signaling transmitted by the base station is not received until the timer expires, change the first terminal capability configured for the first SIM card to the third terminal capability — 604'

FIG. 6B

In response to determining that a status of at least one SIM card other than a first SIM card has changed, determine that a first terminal capability configured for the first SIM card needs to be changed, where the first SIM card is a SIM card that establishes a RRC connection with the base station on the multi-card terminal — 701

In response to determining that the first terminal capability needs to be changed, report the terminal capability of the multi-card terminal to the base station — 702

Report a reason for changing the first terminal capability to the base station — 703

FIG. 7

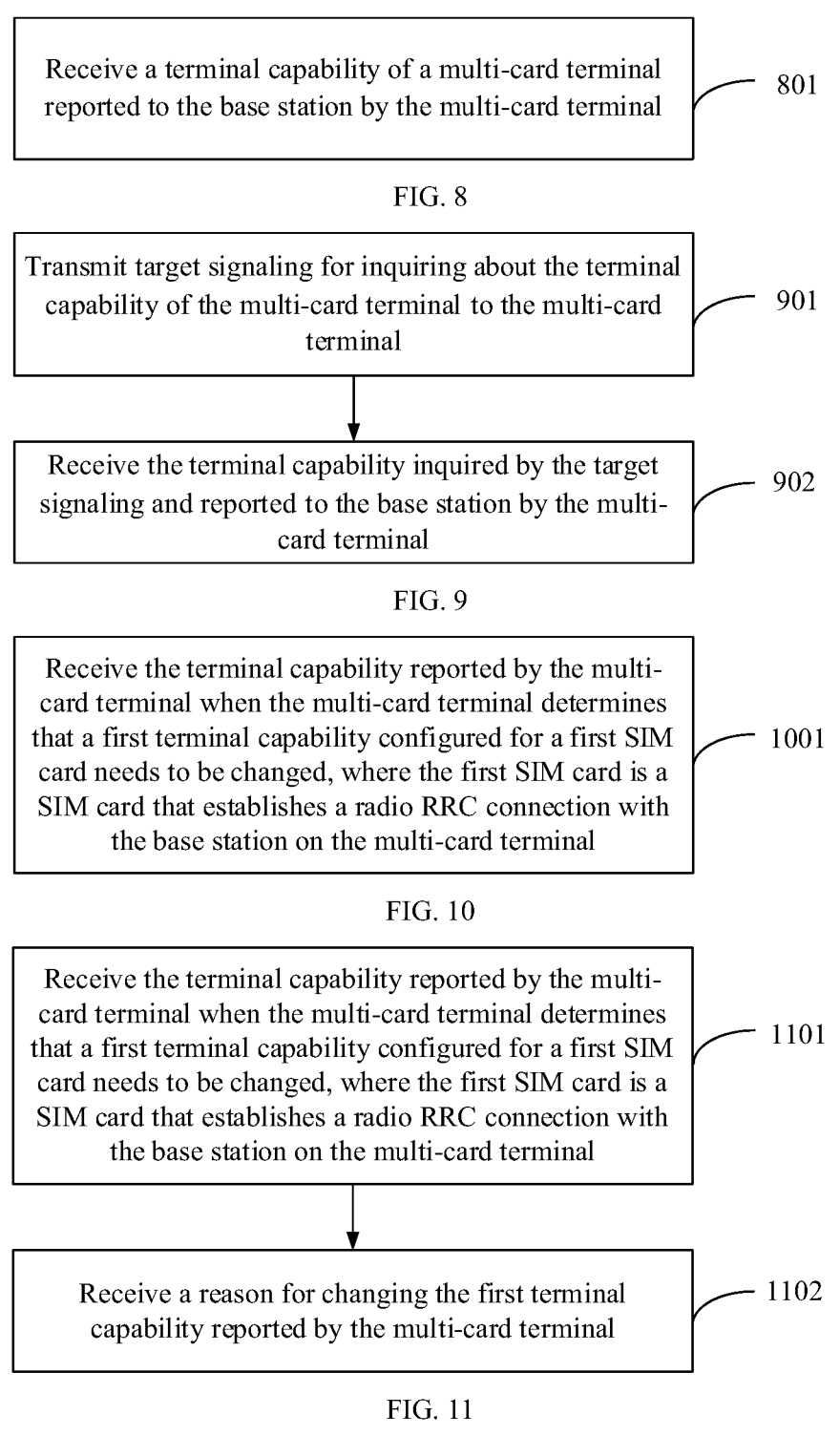

Receive a terminal capability of a multi-card terminal reported to the base station by the multi-card terminal —— 801

FIG. 8

Transmit target signaling for inquiring about the terminal capability of the multi-card terminal to the multi-card terminal —— 901

Receive the terminal capability inquired by the target signaling and reported to the base station by the multi-card terminal —— 902

FIG. 9

Receive the terminal capability reported by the multi-card terminal when the multi-card terminal determines that a first terminal capability configured for a first SIM card needs to be changed, where the first SIM card is a SIM card that establishes a radio RRC connection with the base station on the multi-card terminal —— 1001

FIG. 10

Receive the terminal capability reported by the multi-card terminal when the multi-card terminal determines that a first terminal capability configured for a first SIM card needs to be changed, where the first SIM card is a SIM card that establishes a radio RRC connection with the base station on the multi-card terminal —— 1101

Receive a reason for changing the first terminal capability reported by the multi-card terminal —— 1102

Memory 1604

Processing component 1602

Power supply component 1606

Multimedia component 1608

Audio component 1610

Processor 1620

Communication component

1618

Sensor component 1616

Input/Output interface 1612

TERMINAL CAPABILITY REPORTING METHOD AND APPARATUS, AND STORAGE MEDIUM

CROSS REFERENCE TO RELATED APPLICATIONS

This application is a National Phase of International Application No. PCT/CN2021/110998, filed on Aug. 5, 2021, the entire contents of which are incorporated herein by reference in their entireties.

TECHNICAL FIELD

The present disclosure relates to the field of communication technologies, and in particular to terminal capability reporting methods and apparatuses, and storage mediums.

BACKGROUND

The 3rd generation partnership project (3GPP) initiated a study project for multi-card terminals during the release 17 (R17) phase, but this study project does not include multi-card terminals with Dual-Tx and/or Dual-Rx. That is, this study project does not include terminals equipped with two or more transmitting antennas and/or two or more receiving antennas.

SUMMARY

According to a first aspect of the embodiment of the present disclosure, there is provided a terminal capability reporting method, performed by a multi-card terminal, and including:

reporting a terminal capability of the multi-card terminal to a base station.

In an embodiment, the method further includes:

receiving target signaling transmitted by the base station for enquiring about the terminal capability of the multi-card terminal;

where reporting the terminal capability of the multi-card terminal to the base station includes:

reporting, based on the target signaling, the terminal capability of the multi-card terminal to the base station.

In an embodiment, the target signaling is configured to enquire about at least one of:

whether a terminal is a multi-card terminal;

whether data transmission simultaneously through two or more transmitting antennas is supported;

whether data reception simultaneously through two or more receiving antennas is supported; or the terminal capability configured for at least one subscriber identity module (SIM) card.

In an embodiment, reporting, based on the target signaling, the terminal capability of the multi-card terminal to the base station includes:

reporting the terminal capability enquired by the target signaling to the base station.

In an embodiment, the target signaling is configured to instruct the multi-card terminal to report the terminal capability.

In an embodiment, reporting the terminal capability of the multi-card terminal to the base station includes at least one of:

reporting an overall terminal capability of the multi-card terminal to the base station;

reporting a first terminal capability configured for a first SIM card to the base station, where the first SIM card is a SIM card that establishes a radio resource control (RRC) connection with the base station on the multi-card terminal; or, reporting a second terminal capability pre-configured or configured for a second SIM card to the base station, where the second SIM card is a SIM card that establishes an RRC connection with any base station and is different from the first SIM card on the multi-card terminal.

In an embodiment, the method further includes:

in response to determining that a status of at least one SIM card other than a first SIM card has changed, determining that a first terminal capability configured for the first SIM card needs to be changed, where the first SIM card is a SIM card that establishes a radio resource control (RRC) connection with the base station on the multi-card terminal;

where reporting the terminal capability of the multi-card terminal to the base station includes:

in response to determining that the first terminal capability needs to be changed, reporting the terminal capability of the multi-card terminal to the base station.

In an embodiment, the method further includes:

changing the first terminal capability configured for the first SIM card to a third terminal capability;

where reporting the terminal capability of the multi-card terminal to the base station includes:

reporting the third terminal capability to the base station.

In an embodiment, reporting the third terminal capability to the base station includes any one of:

reporting the third terminal capability to the base station through terminal assistance information signaling; and reporting the third terminal capability to the base station through terminal capability information signaling.

In an embodiment, reporting the terminal capability of the multi-card terminal to the base station includes:

transmitting terminal capability change signaling to the base station, where the terminal capability change signaling includes a third terminal capability configured for the first SIM card;

where the method further includes:

in response to receiving confirmation change signaling transmitted by the base station, changing the first terminal capability configured for the first SIM card to the third terminal capability.

In an embodiment, the method further includes:

in response to determining that the confirmation change signaling transmitted by the base station is not received, not changing the first terminal capability configured for the first SIM card.

In an embodiment, reporting the terminal capability of the multi-card terminal to the base station includes:

transmitting terminal capability change signaling to the base station, where the terminal capability change signaling includes a third terminal capability configured for the first SIM card;

where the method further includes:

starting a timer, and in response to receiving confirmation change signaling transmitted by the base station before the timer expires, changing the first terminal capability configured for the first SIM card to the third terminal capability.

In an embodiment, the method further includes:

in response to determining that the confirmation change signaling transmitted by the base station is not received until the timer expires, changing the first terminal capability configured for the first SIM card to the third terminal capability.

In an embodiment, the terminal capability change signaling is terminal assistance information signaling.

In an embodiment, the method further includes:

reporting a reason for changing the first terminal capability to the base station.

According to a second aspect of the present disclosure, there is provided a terminal capability reporting method, performed by a base station, and including:

receiving a terminal capability of a multi-card terminal reported to the base station by the multi-card terminal.

In an embodiment, before receiving the terminal capability of the multi-card terminal reported to the base station by the multi-card terminal, the method further includes:

transmitting target signaling for enquiring about the terminal capability of the multi-card terminal to the multi-card terminal.

In an embodiment, the target signaling is configured to enquire about at least one of:

whether a terminal is a multi-card terminal;

whether data transmission simultaneously through two or more transmitting antennas is supported;

whether data reception simultaneously through two or more receiving antennas is supported; or the terminal capability configured for at least one subscriber identity module (SIM) card.

In an embodiment, receiving the terminal capability of the multi-card terminal reported to the base station by the multi-card terminal includes:

receiving the terminal capability enquired by the target signaling and reported to the base station by the multi-card terminal.

In an embodiment, the target signaling is configured to instruct the multi-card terminal to report the terminal capability.

In an embodiment, receiving the terminal capability of the multi-card terminal reported to the base station by the multi-card terminal includes at least one of:

receiving an overall terminal capability of the multi-card terminal reported to the base station by the multi-card terminal;

receiving a first terminal capability configured for a first SIM card reported to the base station by the multi-card terminal, where the first SIM card is a SIM card that establishes a radio resource control (RRC) connection with the base station on the multi-card terminal; or receiving a second terminal capability pre-configured or configured for a second SIM card reported to the base station by the multi-card terminal, where the second SIM card is a SIM card that establishes an RRC connection with any base station and is different from the first SIM card on the multi-card terminal.

In an embodiment, receiving the terminal capability of the multi-card terminal reported to the base station by the multi-card terminal includes:

receiving the terminal capability reported by the multi-card terminal when the multi-card terminal determines that a first terminal capability configured for a first SIM card needs to be changed, where the first SIM card is a SIM card that establishes a radio resource control (RRC) connection with the base station on the multi-card terminal.

In an embodiment, receiving the terminal capability of the multi-card terminal reported to the base station by the multi-card terminal includes:

receiving a third terminal capability reported to the base station by the multi-card terminal, where the third terminal capability is configured for the first SIM card after a status of the first SIM card is changed.

In an embodiment, receiving the terminal capability of the multi-card terminal reported to the base station by the multi-card terminal includes:

receiving terminal capability change signaling reported to the base station by the multi-card terminal, where the terminal capability change signaling includes a third terminal capability configured for the first SIM card.

In an embodiment, the method further includes:

transmitting, based on the terminal capability change signaling, confirmation change signaling to the multi-card terminal.

In an embodiment, the method further includes:

receiving a reason for changing the first terminal capability reported by the multi-card terminal.

According to a third aspect of the present disclosure, there is provided a terminal capability reporting device, including:

a processor; and a memory storing instructions executable by the processor, where the processor is configured to, when executing the instructions, perform the terminal capability reporting method described in the first aspect.

According to an fourth aspect of the present disclosure, there is provided a terminal capability reporting device, including:

a processor; and a memory storing instructions executable by the processor, where the processor is configured to, when executing the instructions, perform the terminal capability reporting method described in the second aspect.

It will be understood that the above general descriptions and subsequent detailed descriptions are merely illustrative and explanatory rather than limiting of the present disclosure.

BRIEF DESCRIPTION OF THE DRAWINGS

The drawings incorporated into the specification to constitute a part of the specification illustrate embodiments consistent with the present disclosure and interpret the principle of the embodiments of the present disclosure together with the specification.

FIG. 1 is a flowchart illustrating a terminal capability reporting method according to an embodiment of the present disclosure.

FIG. 2 is a flowchart illustrating a terminal capability reporting method according to another embodiment of the present disclosure.

FIG. 3 is a flowchart illustrating a terminal capability reporting method according to yet another embodiment of the present disclosure.

FIG. 4 is a flowchart illustrating a terminal capability reporting method according to still another embodiment of the present disclosure.

FIGS. 5A to 5B are flowcharts illustrating a terminal capability reporting method according to still another embodiment of the present disclosure.

FIGS. 6A to 6B are flowcharts illustrating a terminal capability reporting method according to still another embodiment of the present disclosure.

FIG. 7 is a flowchart illustrating a terminal capability reporting method according to still another embodiment of the present disclosure.

FIG. 8 is a flowchart illustrating a terminal capability reporting method according to still another embodiment of the present disclosure.

FIG. 9 is a flowchart illustrating a terminal capability reporting method according to still another embodiment of the present disclosure.

FIG. 10 is a flowchart illustrating a terminal capability reporting method according to still another embodiment of the present disclosure.

FIG. 11 is a flowchart illustrating a terminal capability reporting method according to still another embodiment of the present disclosure.

DETAILED DESCRIPTION OF THE EMBODIMENTS

Figures 12, 13, 14:
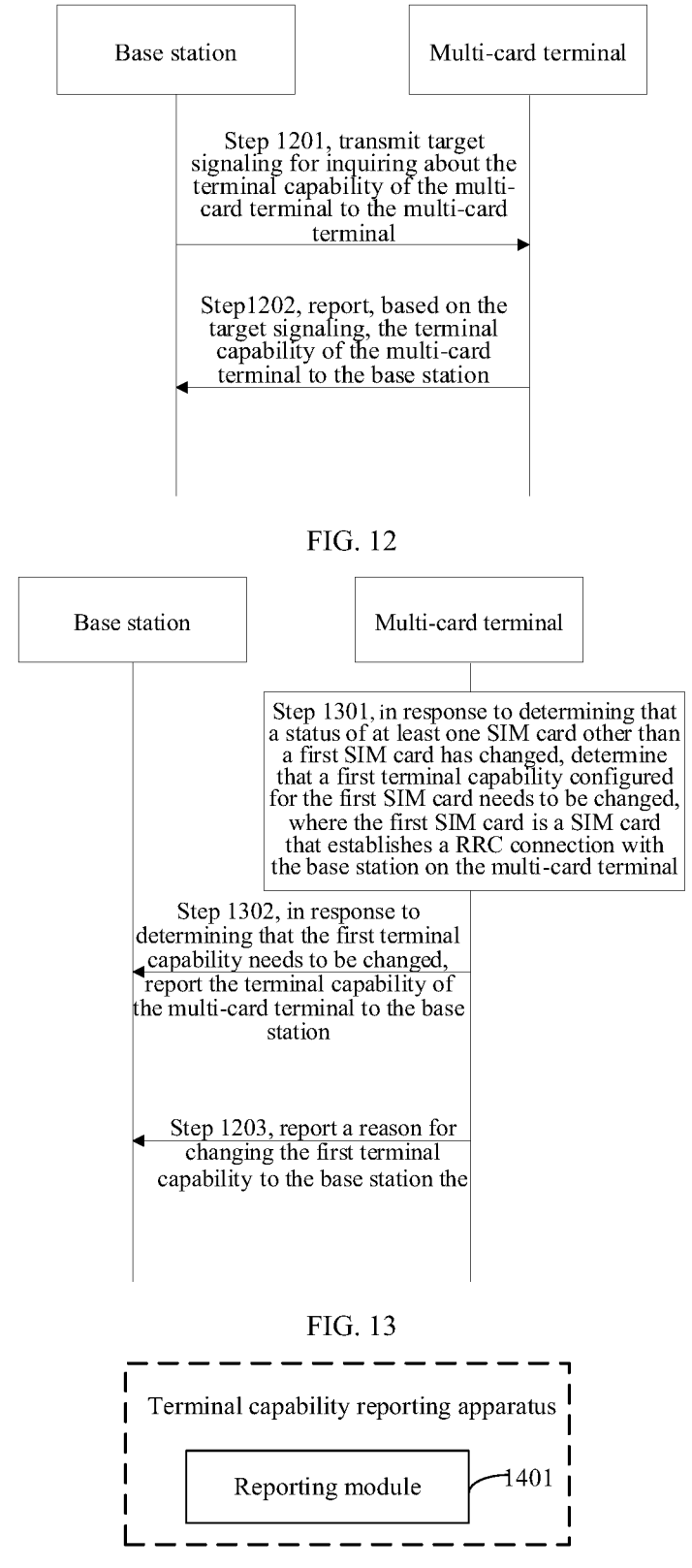
FIG. 12 is a flowchart illustrating a terminal capability reporting method according to still another embodiment of the present disclosure.
FIG. 13 is a flowchart illustrating a terminal capability reporting method according to still another embodiment of the present disclosure.
FIG. 14 is a block diagram illustrating a terminal capability reporting apparatus according to an embodiment of the present disclosure.

Embodiments will be described in details herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are used for the purpose of describing particular embodiments only, and are not intended to limit the present disclosure. Terms determined by "a", "the", and "said" in their singular forms in the present disclosure and the appended claims are also intended to include a plurality, unless clearly indicated otherwise in the context. It should also be understood that the term "and/or" as used herein refers to and includes any or all possible combinations of one or more of the associated listed items.

It is to be understood that, although the terms "first," "second," "third," and the like may be used in the embodiments of the present disclosure to describe various information, such information should not be limited to these terms. These terms are only configured to distinguish a category of information from another. For example, without departing from the scope of the present disclosure, first information may be referred to as second information; and similarly, the second information may also be referred to as the first information. Depending on the context, the term "if" as used herein may be interpreted as "when" or "upon" or "in response to determining".

However, the multi-card terminals with Dual-Tx and/or Dual-Rx face additional issues compared to other types of multi-card terminals. For instance, when a subscriber identity module (SIM) card, assumed to be SIM card #1, is active on a multi-card terminal, while another SIM card, assumed to be SIM card #2, is inactive, the SIM card #1 can utilize all the terminal capability. But when the SIM card #2 is switched to active status, and both SIM cards are operating simultaneously, the capability of the SIM card #1 may be affected.

In the related art, a multi-card terminal needs to update capability information by detaching from the network side equipment and then reattaching. This leads to service interruptions and severely impacts service performance.

To overcome the problems in the related art, the embodiment of the present disclosure provides terminal capability reporting methods and apparatuses, and storage mediums.

The following describes the terminal capability reporting method provided by the present disclosure, first from the multi-card terminal side.

An embodiment of the present disclosure provides a terminal capability reporting method. FIG. 1 is a flowchart illustrating a terminal capability reporting method according to an embodiment of the present disclosure. The method can be applied to a multi-card terminal. The multi-card terminal refers to a terminal that supports the operation of two or more SIM cards simultaneously. Referring to FIG. 1, the method may include the following step 101.

At step 101, the multi-card terminal reports a terminal capability thereof to the base station.

In this embodiment, the multi-card terminal can report its own terminal capability to the base station, so that the base station can subsequently perform a configuration for the multi-card terminal based on the terminal capability, thereby an impact on the multi-card terminal services can be avoided.

FIG. 2 is a flowchart illustrating a terminal capability reporting method according to another embodiment of the present disclosure, and the method can be applied to a multi-card terminal. Referring to FIG. 2, the method may include the following steps 201 to 202.

At step 201, the multi-card terminal receives target signaling transmitted by the base station for enquiring about the terminal capability of the multi-card terminal.

In a possible implementation, the target signaling may be radio resource control (RRC) signaling. The base station can enquire about the terminal capability of the multi-card terminal through this RRC signaling. In an embodiment, the RRC signaling may adopt, but is not limited to, user equipment (UE) capability enquiry signaling.

At step 202, the multi-card terminal reports the terminal capability thereof to the base station based on the target signaling.

In this embodiment, the multi-card terminal may report its own terminal capability based on the target signaling transmitted by the base station, such that the base station can timely obtain the terminal capability of the multi-card terminal. The base station can subsequently configure the multi-card terminal accordingly, thereby any of interruption and impact on the multi-card terminal services can be avoided.

In some embodiments, the target signaling transmitted by the base station may be configured to enquire about at least one of: whether a terminal is a multi-card terminal; whether data transmission simultaneously through two or more transmitting antennas is supported; whether data reception simultaneously through two or more receiving antennas is supported; or the terminal capability configured for at least one SIM card.

In this embodiment, the base station may directly enquire about the information content (for example, the terminal capability) from the multi-card terminal through the target signaling. The terminal capability configured for at least one SIM card includes, but is not limited to, a capability configured individually for each of the SIM cards, as well as an overall terminal capability of the multi-card terminal. The terminal capability of any single SIM card or the overall terminal capability of the multi-card terminal involved in the present disclosure includes, but is not limited to, a capability to perform service functions of any single SIM card or the multi-card terminal.

Accordingly, the multi-card terminal may at least report the specific terminal capability enquired by the target signaling to the base station. For example, the target signaling is configured to enquire about a terminal capability configured for a SIM card #1 by the multi-card terminal, and the multi-card terminal may at least report the terminal capability configured for the SIM card #1.

In this embodiment, the base station may, through an explicit indication based on the target signaling, directly specify a specific terminal capability that the multi-card terminal needs to report. The multi-card terminal may, based on the target signaling, promptly report its terminal capability to the base station, such that the base station can subsequently configure the multi-card terminal accordingly, thereby any of interruption and impact on the multi-card terminal services can be avoided.

In some embodiments, the target signaling is configured to enquire about the terminal capability of the multi-card terminal and to instruct the multi-card terminal to report its terminal capability.

In this embodiment, the target signaling may not specify a specific terminal capability to be reported, and when receiving the target signaling, the multi-card terminal can report its own terminal capability.

In this embodiment, the base station may not indicate the specific terminal capability to be reported in the target signaling. Instead, the base station may implicitly instruct the multi-card terminal to report its own terminal capability. The multi-card terminal can, based on the target signaling, promptly report its terminal capability to the base station, such that the base station can subsequently configure the multi-card terminal accordingly, thereby any of interruption and impact on the multi-card terminal services can be avoided.

In some embodiments, when the multi-card terminal reports the terminal capability based on the target signaling, the reported terminal capability may include at least one of: the overall terminal capability of the multi-card terminal; a first terminal capability configured for a first SIM card, where the first SIM card is a SIM card that establishes an RRC connection with the base station on the multi-card terminal; or a second terminal capability pre-configured or already configured for the second SIM card, where the second SIM card is a SIM card that establishes an RRC connection with any base station and is different from the first SIM card on the multi-card terminal.

In this embodiment, the second SIM card may establish an RRC connection with the base station or with another base station. This is not limited by the present disclosure.

In this embodiment, the multi-card terminal can report the terminal capability based on the target signaling transmitted by the base station, so that the base station can subsequently configure the multi-card terminal accordingly, thereby any of interruption and impact on the multi-card terminal services can be avoided.

FIG. 3 is a flowchart illustrating a terminal capability reporting method according to yet another embodiment of the present disclosure, and the method can be applied to a multi-card terminal. In some embodiments, referring to FIG. 3, the method may include the following steps 301 to 302:

At step 301, in response to determining that a status of at least one SIM card other than a first SIM card has changed, the multi-card terminal determines that a first terminal capability configured for the first SIM card needs to be changed, where the first SIM card is a SIM card that establishes an RRC connection with the base station on the multi-card terminal.

In this embodiment, a change in status refers to a switch to any of an active state, an idle state, and a connected state.

At step 302, in response to determining that the first terminal capability needs to be changed, the terminal capability of the multi-card terminal is reported to the base station.

In this embodiment, the multi-card terminal may proactively report its terminal capability to the base station if the multi-card terminal determines that the first terminal capability configured for the first SIM card require needs to be changed. As a result, the base station can timely obtain the terminal capability of the multi-card terminal, and subsequently configure the multi-card terminal accordingly, thereby any of interruption and impact on the multi-card terminal services can be avoided.

FIG. 4 is a flowchart illustrating a terminal capability reporting method according to still another embodiment of the present disclosure, and the method can be applied to a multi-card terminal. In some embodiments, referring to FIG. 4, the method may include the following steps 401 to 402.

At step 401, in response to determining that a status of at least one SIM card other than a first SIM card has changed, the multi-card terminal determines that a first terminal capability configured for the first SIM card needs to be changed, where the first SIM card is a SIM card that establishes an RRC connection with the base station on the multi-card terminal.

In step 402, the first terminal capability configured for the first SIM card is changed to a third terminal capability.

In this disclosed embodiment, the third terminal capability may be different from the first terminal capability.

At step 403, the third terminal capability is reported to the base station.

In a possible implementation, the terminal may report the third terminal capability to the base station via UE assistance information signaling.

In another possible implementation, the terminal may report the third terminal capability to the base station via UE capability information signaling.

In this embodiment, in response to determining that the first terminal capability configured for the first SIM card needs to be changed, the multi-card terminal may report the third terminal capability to the base station after the first terminal capability configured for the first SIM card is changed to the third terminal capability. As a result, the base station can promptly obtain the updated terminal capability of the first SIM card, and subsequently configure the multi-card terminal accordingly, thereby any of interruption and impact on the multi-card terminal services can be avoided.

FIG. 5A is a flowchart illustrating a terminal capability reporting method according to still another embodiment of the present disclosure, and the method can be applied to a multi-card terminal. In some embodiments, referring to FIG. 5A, the method may include the following steps 501 to 503.

At step 501, in response to determining that a status of at least one SIM card other than a first SIM card has changed, the multi-card terminal determines that a first terminal capability configured for the first SIM card needs to be changed, where the first SIM card is a SIM card that establishes an RRC connection with the base station on the multi-card terminal.

At step 502, terminal capability change signaling is transmitted to the base station, where the terminal capability change signaling includes a third terminal capability configured for the first SIM card.

In a possible implementation, the terminal capability change signaling can be UE assistance information signaling. The terminal can report the third terminal capability configured for the first SIM card to the base station through the UE assistance information signaling.

At step 503, in response to receiving confirmation change signaling transmitted by the base station, the first terminal capability configured for the first SIM card is changed to the third terminal capability.

In this embodiment, in response to determining that the first terminal capability configured for the first SIM card needs to be changed, the multi-card terminal may report the third terminal capability configured for the first SIM card to the base station through the terminal capability change signaling. After the base station replies with the confirmation change signaling, the multi-card terminal changes the first terminal capability configured for the first SIM card to the third terminal capability. This avoids any interruption and impact on the multi-card terminal services.

FIG. 5B is a flowchart illustrating a terminal capability reporting method according to still another embodiment of the present disclosure, and the method can be applied to a multi-card terminal. In some embodiments, referring to FIG. 5B, the method may include the following steps 501' to 503'.

At step 501', in response to determining that a status of at least one SIM card other than a first SIM card has changed, the multi-card terminal determines that a first terminal capability configured for the first SIM card needs to be changed, where the first SIM card is a SIM card that establishes an RRC connection with the base station on the multi-card terminal.

At step 502', terminal capability change signaling is transmitted to the base station, where the terminal capability change signaling includes a third terminal capability configured for the first SIM card.

In a possible implementation, the terminal capability change signaling can be the UE assistance information signaling.

In step 503', in response to determining that the confirmation change signaling transmitted by the base station is not received, the first terminal capability configured for the first SIM card is not changed.

In this embodiment, in response to determining that the first terminal capability configured for the first SIM card needs to be changed, the multi-card terminal may report the third terminal capability configured for the first SIM card to the base station through the terminal capability change signaling. If the base station does not reply with the confirmation change signaling, the multi-card terminal does not change the terminal capability configured for the first SIM card. That is, the terminal capability of the first SIM card remains as the first terminal capability. This avoids any interruption and impact on the multi-card terminal services.

FIG. 6A is a flowchart illustrating a terminal capability reporting method according to still another embodiment of the present disclosure, and the method can be applied to a multi-card terminal. In some embodiments, referring to FIG. 6A, the method may include the following steps 601 to 604.

At step 601, in response to determining that a status of at least one SIM card other than a first SIM card has changed, the multi-card terminal determines that a first terminal capability configured for the first SIM card needs to be changed, where the first SIM card is a SIM card that establishes a RRC connection with the base station on the multi-card terminal.

At step 602, terminal capability change signaling is transmitted to the base station, where the terminal capability change signaling includes a third terminal capability configured for the first SIM card.

In a possible implementation, the terminal capability change signaling may be the UE assistance information signaling.

At step 603, a timer is started.

In this embodiment, the timing duration of the timer may be determined by protocol agreement or configured by the base station, and the present disclosure is not limited hereto.

At step 604, in response to receiving confirmation change signaling transmitted by the base station before the timer expires, the first terminal capability configured for the first SIM card is changed to the third terminal capability.

In this embodiment, in response to determining that the first terminal capability configured for the first SIM card needs to be changed, the multi-card terminal may report the third terminal capability configured for the first SIM card to the base station through the terminal capability change signaling. Meanwhile, the multi-card terminal starts a timer. If the multi-card terminal receives the confirmation change signaling replied by the base station before the timer expires, the first terminal capability configured for the first SIM card is changed to the third terminal capability. This avoids any interruption and impact on the multi-card terminal services.

FIG. 6B is a flowchart illustrating a terminal capability reporting method according to still another embodiment of the present disclosure, and the method can be applied to a multi-card terminal. In some embodiments, referring to FIG. 6B, the method may include the following steps 601' to 604'

At step 601', in response to determining that a status of at least one SIM card other than a first SIM card has changed, the multi-card terminal determines that a first terminal capability configured for the first SIM card needs to be changed, where the first SIM card is a SIM card that establishes an RRC connection with the base station on the multi-card terminal.

At step 602', terminal capability change signaling is transmitted to the base station, where the terminal capability change signaling includes a third terminal capability configured for the first SIM card.

In a possible implementation, the terminal capability change signaling can be the UE assistance information signaling.

At step 603', a timer is started.

In this embodiment, the timing duration of the timer may be determined by protocol agreement or configured by the base station, and the present disclosure is not limited hereto.

At step 604', in response to determining that the confirmation change signaling transmitted by the base station is not received until the timer expires, the first terminal capability configured for the first SIM card is changed to the third terminal capability.

In this embodiment, in response to determining that the first terminal capability configured for the first SIM card needs to be changed, the multi-card terminal may report the third terminal capability configured for the first SIM card to the base station through the terminal capability change signaling. Meanwhile, the multi-card terminal starts a timer. If the multi-card terminal does not receive the confirmation change signaling from the base until the timer expires, the multi-card terminal will still proceed to change the terminal capability configured for the first SIM card, and in particular, to change the first terminal capability to the third terminal capability. This avoids any of interruption and impact on the multi-card terminal services.

FIG. 7 is a flowchart illustrating a terminal capability reporting method according to still another embodiment of the present disclosure, and the method can be applied to a multi-card terminal. In some embodiments, referring to FIG. 7, the method may include the following steps 701 to 703.

At step 701, in response to determining that a status of at least one SIM card other than a first SIM card has changed, the multi-card terminal determines that a first terminal capability configured for the first SIM card needs to be changed, where the first SIM card is a SIM card that establishes an RRC connection with the base station on the multi-card terminal.

In this embodiment, a change in status refers to a switch to any of an active state, an idle state, and a connected state.

At step 702, in response to determining that the first terminal capability needs to be changed, the terminal capability of the multi-card terminal is reported to the base station.

In step 703, a reason for changing the first terminal capability is reported to the base station.

In this embodiment, the reason for changing the first terminal capability can be due to a change in the status of at least one SIM card on the multi-card terminal, other than the first SIM card.

In this embodiment, when the first terminal capability of the first SIM card on the multi-card terminal is changed, the terminal can not only proactively report its terminal capability to the base station but also report the reason for changing the first terminal capability to the base station, facilitating the base station in determining the cause of the change in the first terminal capability. This enhances availability.

The following describes the terminal capability reporting method provided by the present disclosure, first from the base station side.

An embodiment of the present disclosure provides a terminal capability reporting method. FIG. 8 is a flowchart illustrating a terminal capability reporting method according to an embodiment of the present disclosure. The method can be applied to a base station. Referring to FIG. 8, the method may include the following step 801.

At step 801, a terminal capability of a multi-card terminal reported to the base station by the multi-card terminal is received.

In this embodiment, when receiving the terminal capability reported by the multi-card terminal, the base station can accordingly perform a configuration based on the terminal capability, thereby an impact on the multi-card terminal services is avoided.

FIG. 9 is a flowchart illustrating a terminal capability reporting method according to another embodiment of the present disclosure, and the method can be applied to a base station. In some embodiments, referring to FIG. 9, the method may include the following steps 901 to 902.

At step 901, target signaling for enquiring about the terminal capability of the multi-card terminal is transmitted to the multi-card terminal.

At step 902, the terminal capability enquired by the target signaling and reported to the base station by the multi-card terminal is received.

In this embodiment, the base station can transmit the target signaling to the multi-card terminal when the base station needs to ascertain the terminal capability of the multi-card terminal, thereby prompting the multi-card terminal to report its terminal capability based on the target signaling. This approach is straightforward and highly usable.

In some embodiments, the target signaling transmitted by the base station can be RRC signaling, for example, UE capability enquiry signaling.

In a possible implementation, the target signaling is configured to enquire about at least one of: whether a terminal is a multi-card terminal; whether data transmission simultaneously through two or more transmitting antennas is supported; whether data reception simultaneously through two or more receiving antennas is supported; or the terminal capability configured for at least one SIM card.

In another possible implementation, the target signaling is configured to instruct the multi-card terminal to report the terminal capability of the multi-card terminal. The target signaling does not include a specific terminal capability to be enquired about, yet the multi-card terminal can also report its own terminal capability when receiving the target signaling.

In this embodiment, the base station can receive the terminal capability reported by the multi-card terminal based on the target signaling, so that the base station can subsequently perform a configuration for the multi-card terminal based on the terminal capability, thereby any impact on the multi-card terminal services can be avoided.

In some embodiments, the terminal capability reported by the multi-card terminals based on the target signaling may include at least one of: the overall terminal capability of the multi-card terminal; a first terminal capability configured for a first SIM card, where the first SIM card is a SIM card that establishes an RRC connection with the base station on the multi-card terminal; or a second terminal capability preconfigured or already configured for the second SIM card, where the second SIM card is a SIM card that establishes an RRC connection with any base station and is different from the first SIM card on the multi-card terminal.

FIG. 10 is a flowchart illustrating a terminal capability reporting method according to yet another embodiment of the present disclosure, and the method can be applied to a base station. In some embodiments, referring to FIG. 10, the method may include the following step 1001.

At step 1001, the terminal capability reported by the multi-card terminal is received when the multi-card terminal determines that a first terminal capability configured for a first SIM card needs to be changed, where the first SIM card is a SIM card that establishes an RRC connection with the base station on the multi-card terminal.

In this embodiment, the multi-card terminal may proactively report the terminal capability to the base station when the multi-card terminal determines that the first terminal capability configured for the first SIM card needs to be changed.

In a possible implementation, the multi-card terminal reports the third terminal capability to the base station after the first terminal capability configured for the first SIM card is changed to the third terminal capability.

In another possible implementation, the multi-card terminal may report the expected third terminal capability configured for the first SIM card to the base station. That is, the multi-card terminal does not change the terminal capacity of the first SIM card, but instead first reports the expected third terminal capacity to the base station.

Accordingly, the base station may not reply with the confirmation change signaling. Alternatively, the base station may reply with the confirmation change signaling to the multi-card terminal. Whether the multi-card terminal changes the terminal capability of the first SIM card has already been described on the multi-card terminal side and will not be reiterated herein.

In this embodiment, the multi-card terminal can proactively report its terminal capability when the multi-card terminal determines that the first terminal capability configured for the first SIM card needs to be changed. As a result, the base station can timely obtain the terminal capability of the multi-card terminal, and subsequently configure the multi-card terminal accordingly, thereby any of interruption and impact on the multi-card terminal services can be avoided.

FIG. 11 is a flowchart illustrating a terminal capability reporting method according to still another embodiment of the present disclosure, and the method can be applied to a base station. In some embodiments, referring to FIG. 11, the method may include the following steps 1101 to 1102.

At step 1101, the terminal capability reported by the multi-card terminal is received when the multi-card terminal determines that a first terminal capability configured for a first SIM card needs to be changed, where the first SIM card is a SIM card that establishes an RRC connection with the base station on the multi-card terminal.

At step 1102, a reason for changing the first terminal capability reported by the multi-card terminal is received.

In this embodiment, the base station can receive the terminal capability actively reported by the multi-card terminal, as well as the reason for changing the first terminal capability reported by the multi-card terminal. This approach is highly usable.

FIG. 12 is a flowchart illustrating a terminal capability reporting method according to still another embodiment of the present disclosure. In some embodiments, referring to FIG. 12, the method may include the following steps 1201 to 1202.

At step 1201, the base station transmits the target signaling for enquiring about the terminal capability of the multi-card terminal to the multi-card terminal.

The target signaling can be RRC signaling, which may be, but is not limited to, the UE capability enquiry signaling.

At step 1202, the multi-card terminal reports the terminal capability of the multi-card terminal to the base station based on the target signaling.

In this embodiment, the multi-card terminal may report its terminal capability to the base station based on the target signaling transmitted by the base station, such that the base station can subsequently configure the multi-card terminal based on the terminal capability, thereby any of interruption and impact on the multi-card terminal services can be avoided.

FIG. 13 is a flowchart illustrating a terminal capability reporting method according to still another embodiment of the present disclosure. In some embodiments, referring to FIG. 13, the method may include the following steps 1301 to 1303.

At step 1301, the multi-card terminal, in response to determining that the status of at least one SIM card other than the first SIM card has changed, determines that the first terminal capability configured for the first SIM card needs to be changed, where the first SIM card is a SIM card that establishes an RRC connection with the base station on the multi-card terminal.

A change in status refers to a switch to any of an active state, an idle state, and a connected state.

At step 1302, the multi-card terminal, in response to determining that the first terminal capability needs to be changed, reports the terminal capability of the multi-card terminal to the base station.

At step 1303, the multi-card terminal reports a reason for changing the first terminal capability.

In this embodiment, the multi-card terminal may proactively report its terminal capability to the base station when the multi-card terminal determines that the first terminal capability configured for the first SIM card needs to be changed. The multi-card terminal can also report the reason for changing the first terminal capability, such that the base station can timely obtain the terminal capability of the multi-card terminal. Subsequently, the base station can configure the multi-card terminal accordingly, thereby any of interruption and impact on the multi-card terminal services can be avoided.

Corresponding to the methods for implementing application functions, the present disclosure also provides embodiments of apparatuses for implementing the application functions.

FIG. 14 is a block diagram illustrating a terminal capability reporting apparatus according to an embodiment of the present disclosure, and the apparatus can be applied to a multi-card terminal. Referring to FIG. 14, the apparatus may include a reporting module 1401.

The reporting module 1401 is configured to report a terminal capability of the multi-card terminal to a base station.

The specific implementation is similar to the process illustrated in the embodiment shown in FIG. 1, and will not be described in detail herein.

In some embodiments, the apparatus further includes a receiving module.

The receiving module is configured to receive target signaling transmitted by the base station for enquiring about the terminal capability of the multi-card terminal.

The reporting module is also configured to report the terminal capability of the multi-card terminal to the base station based on the target signaling.

The specific implementation is similar to the process illustrated in the embodiment shown in FIG. 2, and will not be described in detail herein.

In some embodiments, the apparatus also includes a processing module.

The processing module is configured to, in response to determining that a status of at least one SIM card other than a first SIM card has changed, determine that a first terminal capability configured for the first SIM card needs to be changed, where the first SIM card is a SIM card that establishes an RRC connection with the base station on the multi-card terminal.

The reporting module is also configured to, in response to determining that the first terminal capability needs to be changed, report the terminal capability of the multi-card terminal to the base station.

The specific implementation is similar to the process illustrated in the embodiment shown in FIG. 3, and will not be described in detail herein.

In some embodiments, the apparatus also includes a processing module.

The processing module, configured to:

in response to determining that a status of at least one SIM card other than a first SIM card has changed, determine that a first terminal capability configured for the first SIM card needs to be changed, where the first SIM card is a SIM card that establishes an RRC connection with the base station on the multi-card terminal; and change the first terminal capability configured for the first SIM card to a third terminal capability.

The reporting module is also configured to report the third terminal capability to the base station.

The specific implementation is similar to the process illustrated in the embodiment shown in FIG. 4, and will not be described in detail herein.

In some embodiments, the apparatus further includes a processing module.

The processing module is configured to, in response to determining that a status of at least one SIM card other than a first SIM card has changed, determine that a first terminal capability configured for the first SIM card needs to be changed, where the first SIM card is a SIM card that establishes an RRC connection with the base station on the multi-card terminal.

The reporting module is also configured to transmit terminal capability change signaling to the base station, where the terminal capability change signaling includes a third terminal capability configured for the first SIM card.

Furthermore, the processing module is also configured to:

in response to receiving confirmation change signaling transmitted by the base station, change the first terminal capability configured for the first SIM card to the third terminal capability; or in response to determining that the confirmation change signaling transmitted by the base station is not received, not change the first terminal capability configured for the first SIM card.

The specific implementation is similar to the process illustrated in the embodiment shown in FIGS. 5A to 5B, and will not be described in detail herein.

In some embodiments, the apparatus further includes a processing module.

The processing module is configured to, in response to determining that a status of at least one SIM card other than a first SIM card has changed, determine that a first terminal capability configured for the first SIM card needs to be changed, where the first SIM card is a SIM card that establishes an RRC connection with the base station on the multi-card terminal.

The reporting module is also configured to transmit terminal capability change signaling to the base station, where the terminal capability change signaling includes a third terminal capability configured for the first SIM card.

Furthermore, the processing module is also configured to:

start a timer; and in response to receiving confirmation change signaling transmitted by the base station before the timer expires, change the first terminal capability configured for the first SIM card to the third terminal capability; or in response to determining that the confirmation change signaling transmitted by the base station is not received until the timer expires, change the first terminal capability configured for the first SIM card to the third terminal capability.

The specific implementation is similar to the process illustrated in the embodiment shown in FIGS. 6A to 6B, and will not be described in detail herein.

In some embodiments, the apparatus further includes a processing module.

The processing module is configured to, in response to determining that a status of at least one SIM card other than a first SIM card has changed, determine that a first terminal capability configured for the first SIM card needs to be changed, where the first SIM card is a SIM card that establishes an RRC connection with the base station on the multi-card terminal.

The reporting module is further configured to:

in response to determining that the first terminal capability needs to be changed, report the terminal capability of the multi-card terminal to the base station; and report a reason for changing the first terminal capability to the base station.

The specific implementation is similar to the process illustrated in the embodiment shown in FIG. 7, and will not be described in detail herein.

Figures 15, 16:
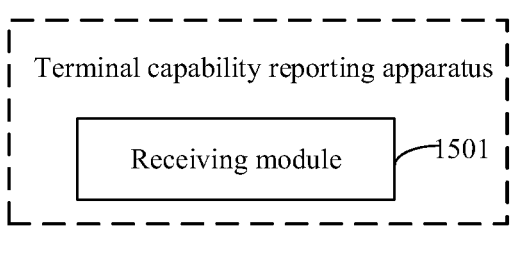
FIG. 15 is a block diagram illustrating a terminal capability reporting apparatus according to another embodiment of the present disclosure.
FIG. 16 is a structural schematic diagram illustrating a terminal capability reporting device according to an embodiment of the present disclosure.

FIG. 15 is a block diagram illustrating a terminal capability reporting apparatus according to another embodiment of the present disclosure, and the apparatus can be applied to a base station. Referring to FIG. 15, the apparatus may include a receiving module 1501.

The receiving module 1501 is configured to receive a terminal capability of a multi-card terminal reported to the base station by the multi-card terminal.

The specific implementation is similar to the process illustrated in the embodiment shown in FIG. 8, and will not be described in detail herein.

In some embodiments, the device may also include a transmitting module.

The transmitting module is configured to transmit target signaling for enquiring about the terminal capability of the multi-card terminal to the multi-card terminal.

The receiving module is also configured to receive the terminal capability enquired by the target signaling and reported to the base station by the multi-card terminal.

The specific implementation is similar to the process illustrated in the embodiment shown in FIG. 9, and will not be described in detail herein.

In some embodiments, the receiving module is further configured to receive the terminal capability reported by the multi-card terminal when the multi-card terminal determines that a first terminal capability configured for a first SIM card needs to be changed, where the first SIM card is a SIM card that establishes an RRC connection with the base station on the multi-card terminal.

The specific implementation is similar to the process illustrated in the embodiment shown in FIG. 10, and will not be described in detail herein.

In some embodiments, the receiving module is also configured to:

receive the terminal capability reported by the multi-card terminal when the multi-card terminal determines that a first terminal capability configured for a first SIM card needs to be changed, where the first SIM card is a SIM card that establishes an RRC connection with the base station on the multi-card terminal; and receive a reason for changing the first terminal capability reported by the multi-card terminal.

The specific implementation is similar to the process illustrated in the embodiment shown in FIG. 11, and will not be described in detail herein.

Since the apparatus embodiments basically correspond to the method embodiments, it is sufficient to refer to relevant parts of the description of the method embodiments. The above-mentioned apparatus embodiments are merely schematic, where the modules described as separated components may or may not be physically separated, and the components shown as modules may or may not be physical modules, i.e., they may be located in one place or may be distributed to multiple network modules. Some or all of these modules may be selected to achieve the purpose of the solution according to actual needs, and these modules can be understood and implemented by those skilled in the art without creative works.

Accordingly, the present disclosure also provides a computer-readable storage medium storing computer programs thereon, where the computer programs, when executed by a processor, cause the processor to perform the terminal capability reporting method for the multi-card terminal side.

Accordingly, the present disclosure also provides a computer-readable storage medium storing computer programs thereon, where the computer programs, when executed by a processor, cause the processor to perform the terminal capability reporting method for the base station side.

Accordingly, the present disclosure also provides a terminal capability reporting device, including:

a processor; and a memory storing instructions executable by the processor, where the processor is configured to, when executing the instructions, perform the terminal capability reporting method for the multi-card terminal side.

FIG. 16 is a structural schematic diagram illustrating a terminal capability reporting device 1600 according to an embodiment of the present disclosure. For example, the device 1600 may be a mobile phone, a tablet computer, an e-book reader, a multimedia playback device, a wearable device, an on-board user equipment, an iPad, a smart television, or a multi-card terminal including multiple SIM cards.

Referring to FIG. 16, the device 1600 may include one or more assemblies of a processing component 1602, a memory 1604, a power supply component 1606, a multimedia component 1608, an audio component 1610, an input/output (I/O) interface 1612, a sensor component 1616, and a communication component 1618.

The processing component 1602 generally controls the overall operation of the electronic device 1600, such as operations associated with displays, phone calls, data transmissions, camera operations, and recording operations. The processing component 1602 may include one or more processors 1620 to execute instructions to complete all or a part of the above-mentioned terminal capability reporting method. Further, the processing component 1602 may include one or more modules to facilitate interaction between the processing component 1602 and another component. For example, the processing component 1602 may include a multimedia module to facilitate the interaction between the multimedia component 1608 and the processing component 1602. For another example, the processing component 1602 may read executable instructions from the memory to perform steps in the terminal capability reporting method provided in an example as described above.

The memory 1604 is configured to store different types of data to support operation at the electronic device 1600. Examples of such data include instructions, contact data, phonebook data, messages, pictures, videos, and so on for any application or method that operates on the electronic device 1600. The memory 1604 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 1606 provides power to different assemblies of the electronic device 1600. The power supply component 1606 may include a power source management system, one or more power sources, and other assemblies associated with generating, managing, and distributing power for the electronic device 1600.

The multimedia component 1608 includes a display screen that provides an output interface between the device 1600 and the user. In some embodiments, the multimedia component 1608 includes a front-facing camera and/or a rear-facing camera. When the device 1600 is in an operational mode, such as a photo mode or video mode, the front-facing camera and/or the rear-facing camera can receive external multimedia data. The front-facing and the rear-facing camera may be a fixed optical lens system or be of a focal length and a capability of an optical zoom.

The audio component 1610 is configured to output and/or input an audio signal. For example, the audio component 1610 includes a microphone (MIC). When the electronic device 1600 is in an operating mode, for example, in a call mode, a recording mode or a speech recognition mode, the microphone is configured to receive an external audio signal. The received audio signal may be further stored in the memory 1604 or sent via the communication component 1618. In some embodiments, the audio component 1610 also includes a speaker for outputting an audio signal.

The I/O interface 1612 may provide an interface between the processing component 1602 and peripheral interface modules. The above peripheral interface modules may include a keyboard, a click wheel, buttons, and so on. Such buttons may include, but not limited to: a home button, a volume button, a start button, and a lock button.

The sensor component 1616 includes one or more sensors for evaluating states of the electronic device 1600 in different aspects. For example, the sensor component 1616 may detect the on/off status of the electronic device 1600, and relative positioning of the component, for example, the component is a display and a keypad of the electronic device 1600. The sensor component 1616 may also detect a change in position of the electronic device 1600 or a component of the electronic device 1600, a presence or absence of the contact between a user and the electronic device 1600, an orientation or an acceleration/deceleration of the electronic device 1600, and a change in temperature of the electronic device 1600. The sensor component 1616 may include a proximity sensor configured to detect the presence of a nearby object without any physical contact. The sensor component 1616 may also include an optical sensor, such as a CMOS or CCD image sensor used in an imaging application. In some embodiments, the sensor component 1616 may also include an acceleration sensor, a gyroscope sensor, a magnetic sensor, a pressure sensor, or a temperature sensor.

The communication component 1618 is configured to facilitate wired or wireless data transmission between the electronic device 1600 and other devices. The electronic device 1600 may access a wireless network based on a data transmission standard, such as Wi-Fi, 2G, 3G, 4G 5G or 6G, or a combination thereof. In some embodiments, the communication component 1618 may receive a broadcast signal or broadcast-related information from an external broadcast management system via a broadcast channel. In an example, the communication component 1618 may also include a Near Field Communication (NFC) module to facilitate short-range data transmissions. For example, the NFC module may be implemented based on radio frequency identification (RFID) technology, infrared data association (IrDA) technology, ultra-wideband (UWB) technology, Bluetooth (BT) technology, and other technologies.

In some illustrative embodiments, the electronic device 1600 may be implemented by one or more of an application-specific integrated circuit (ASIC), a digital signal processor (DSP), a digital signal processing device (DSPD), programmable logical device (PLD), field programmable gate array (FPGA), a controller, microcontroller, a microprocessor or other electronic components to perform the above-mentioned terminal capability reporting method.

In an example embodiment, there is also provided a non-transitory machine-readable storage medium including instructions, such as a memory 1604 including instructions, where the instructions are executable by the processor 1620 of the electronic device 1600 to implement the above-mentioned terminal capability reporting method. For example, the non-transitory computer-readable storage medium may be a Read-Only Memory (ROM), a Random Access Memory (RAM), a CD-ROM, a magnetic tape, a floppy disk and an optical data storage device, etc.

Accordingly, the present disclosure also provides a terminal capability reporting device, including:

a processor; and a memory storing instructions executable by the processor, where the processor is configured to, when executing the instructions, perform the terminal capability reporting method for the base station side.

Figure 17:
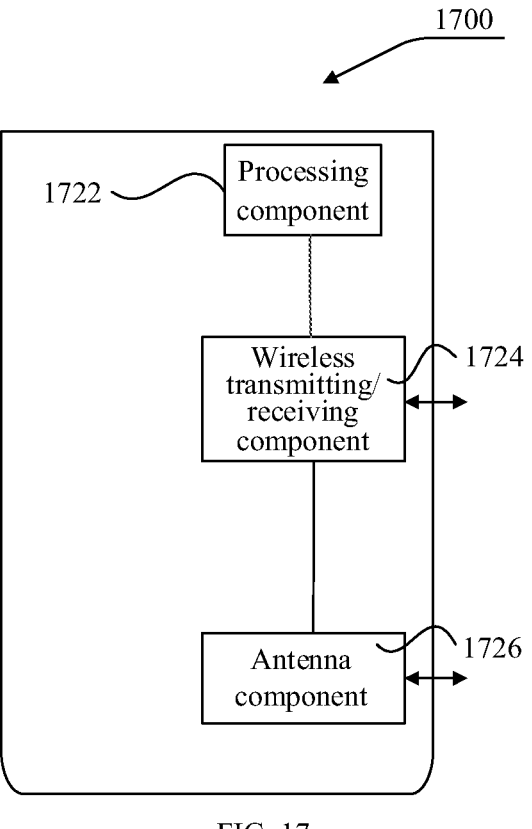
FIG. 17 is a structural schematic diagram illustrating a terminal capability reporting device according to another embodiment of the present disclosure.

FIG. 17 is a structural schematic diagram illustrating a terminal capability reporting device 1700 according to another embodiment of the present disclosure. The device 1700 may be provided as a base station. As shown in FIG. 17, the device 1700 includes a processing component 1722, a wireless transmitting/receiving component 1724, an antenna component 1726, and a signal processing portion specific to the wireless interface, and the processing component 1722 may further include one or more processors.

One of the processors in the processing component 1722 may be configured to implement the terminal capability reporting method for the base station side described in any of the above-mentioned embodiments.

The technical solutions provided by the embodiments of the present disclosure can include the following beneficial effects.

In the embodiments of the present disclosure, the multi-card terminal can report its terminal capability to the base station, so that the base station can subsequently perform a configuration for the multi-card terminal based on the terminal capability, thereby impacts on the multi-card terminal services can be avoided.

In the embodiments of the present disclosure, the multi-card terminal may report its terminal capability based on the target signaling transmitted by the base station, or the multi-card terminal may proactively report its terminal capability to the base station when it determines that the first terminal capability configured for the first SIM card needs to be changed. Therefore, the base station can timely obtain the terminal capability of the multi-card terminal, and subsequently perform a configuration for the multi-card terminal accordingly, thereby any of interruption and impact on the multi-card terminal services can be avoided.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as exemplary only, with a true scope and spirit of the present disclosure indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A terminal capability reporting method, performed by a multi-card terminal, and comprising:

reporting a terminal capability of the multi-card terminal to a base station;

wherein reporting the terminal capability of the multi-card terminal to the base station comprises:

reporting a first terminal capability configured for a first SIM card to the base station, wherein the first SIM card is a SIM card that establishes a radio resource control (RRC) connection with the base station on the multi-card terminal;

reporting a second terminal capability pre-configured or configured for a second SIM card to the base station, wherein the second SIM card is a SIM card that establishes an RRC connection with other base station and is different from the first SIM card on the multi-card terminal;

wherein the method further comprises:

in response to determining that a status of the second SIM card has changed, determining that the first terminal capability configured for the first SIM card needs to be changed;

wherein reporting the terminal capability of the multi-card terminal to the base station comprises any one of:

changing the first terminal capability configured for the first SIM card to a third terminal capability, and reporting the third terminal capability to the base station through terminal assistance information signaling or terminal capability information signaling; and transmitting terminal capability change signaling to the base station, wherein the terminal capability change signaling comprises the third terminal capability configured for the first SIM card;

wherein the method further comprises:

reporting a reason for changing the first terminal capability to the base station, wherein the reason for changing the first terminal capability is due to a change in a status of the second SIM card on the multi-card terminal;

wherein the method further comprises:

starting a timer; and in response to receiving confirmation change signaling transmitted by the base station before the timer expires, changing the first terminal capability configured for the first SIM card to the third terminal capability, wherein a timing duration of the timer is determined by protocol agreement or configured by the base station, wherein the method further comprises:

in response to determining that the confirmation change signaling transmitted by the base station is not received until the timer expires, changing the first terminal capability configured for the first SIM card to the third terminal capability.

2. The method of claim 1, further comprising:

receiving target signaling transmitted by the base station for enquiring about the terminal capability of the multi-card terminal, wherein the target signaling is configured to instruct the multi-card terminal to report the terminal capability;

wherein reporting the terminal capability of the multi-card terminal to the base station comprises:

reporting, based on the target signaling, the terminal capability of the multi-card terminal to the base station.

3. The method of claim 2, wherein the target signaling is configured to enquire about at least one of:

whether a terminal is a multi-card terminal;

whether data transmission simultaneously through two or more transmitting antennas is supported;

whether data reception simultaneously through two or more receiving antennas is supported; or the terminal capability configured for at least one subscriber identity module (SIM) card, wherein reporting, based on the target signaling, the terminal capability of the multi-card terminal to the base station comprises:

reporting the terminal capability enquired by the target signaling to the base station.

4. The method of claim 3, wherein reporting the terminal capability of the multi-card terminal to the base station further comprises:

reporting an overall terminal capability of the multi-card terminal to the base station.

5. A terminal capability reporting method, performed by a base station, and comprising:

receiving a terminal capability of a multi-card terminal reported to the base station by the multi-card terminal;

wherein receiving the terminal capability of the multi-card terminal reported to the base station by the multi-card terminal comprises:

receiving a first terminal capability configured for a first SIM card reported to the base station by the multi-card terminal, wherein the first SIM card is a SIM card that establishes a radio resource control (RRC) connection with the base station on the multi-card terminal;

receiving a second terminal capability pre-configured or configured for a second SIM card reported to the base station by the multi-card terminal, wherein the second SIM card is a SIM card that establishes an RRC connection with other base station and is different from the first SIM card on the multi-card terminal;

wherein receiving the terminal capability of the multi-card terminal reported to the base station by the multi-card terminal comprises any one of:

receiving a third terminal capability reported by the multi-card terminal through terminal assistance information signaling or terminal capability information signaling when the multi-card terminal determines that the first terminal capability configured for a first SIM card needs to be changed, wherein the third terminal capability is configured for the first SIM card after a status of the first SIM card is changed; and receiving terminal capability change signaling reported to the base station by the multi-card terminal, wherein the terminal capability change signaling comprises the third terminal capability configured for the first SIM card;

wherein the method further comprises:

receiving a reason for changing the first terminal capability reported by the multi-card terminal, wherein the reason for changing the first terminal capability is due to a change in a status of the second SIM card on the multi-card terminal;

wherein the method further comprises:

transmitting, based on the terminal capability change signaling, confirmation change signaling to the multi-card terminal.

6. The method of claim 5, further comprising, before receiving the terminal capability of the multi-card terminal reported to the base station by the multi-card terminal:

transmitting target signaling for enquiring about the terminal capability of the multi-card terminal to the base station, wherein the target signaling is configured to instruct the multi-card terminal to report the terminal capability.

7. The method of claim 6, wherein receiving the terminal capability of the multi-card terminal reported to the base station by the multi-card terminal comprises:

receiving the terminal capability enquired by the target signaling and reported to the base station by the multi-card terminal.

8. The method of claim 7, wherein receiving the terminal capability of the multi-card terminal reported to the base station by the multi-card terminal further comprises:

receiving an overall terminal capability of the multi-card terminal reported to the base station by the multi-card terminal.

9. A terminal capability reporting device, comprising:

a processor; and a memory storing instructions executable by the processor, wherein the processor is configured to, when executing the instructions, perform operations comprising:

reporting a terminal capability of a multi-card terminal to a base station;

wherein reporting the terminal capability of the multi-card terminal to the base station comprises:

reporting a first terminal capability configured for a first SIM card to the base station, wherein the first SIM card is a SIM card that establishes a radio resource control (RRC) connection with the base station on the multi-card terminal;

reporting a second terminal capability pre-configured or configured for a second SIM card to the base station, wherein the second SIM card is a SIM card that establishes an RRC connection with other base station and is different from the first SIM card on the multi-card terminal;

wherein the operations further comprise:

in response to determining that a status of the second SIM card has changed determining that the first terminal capability configured for the first SIM card needs to be changed;

wherein reporting the terminal capability of the multi-card terminal to the base station comprises any one of:

changing the first terminal capability configured for the first SIM card to a third terminal capability, and reporting the third terminal capability to the base station through terminal assistance information signaling or terminal capability information signaling; and transmitting terminal capability change signaling to the base station, wherein the terminal capability change signaling comprises the third terminal capability configured for the first SIM card;

wherein the operations further comprise:

reporting a reason for changing the first terminal capability to the base station, wherein the reason for changing the first terminal capability is due to a change in a status of the second SIM card on the multi-card terminal;

wherein the operations further comprise:

starting a timer; and in response to receiving confirmation change signaling transmitted by the base station before the timer expires, changing the first terminal capability configured for the first SIM card to the third terminal capability, wherein a timing duration of the timer is determined by protocol agreement or configured by the base station, wherein the operations further comprise:

in response to determining that the confirmation change signaling transmitted by the base station is not received until the timer expires, changing the first terminal capability configured for the first SIM card to the third terminal capability.

10. A terminal capability reporting device, comprising:

a processor; and a memory storing instructions executable by the processor, wherein the processor is configured to, when executing the instructions, perform the method of claim 5.

* * * * *